Patented June 2, 1931

1,807,930

UNITED STATES PATENT OFFICE

MORRIS OMANSKY, OF ROXBURY, BOSTON, MASSACHUSETTS, ASSIGNOR TO ARTHUR D. LITTLE, INC., OF CAMBRIDGE, MASSACHUSETTS, A CORPORATION OF MASSACHUSETTS

METHOD OF RECLAIMING VULCANIZED RUBBER

No Drawing. Application filed March 12, 1928. Serial No. 261,192.

The present invention relates to a process for reclaiming vulcanized rubber, and more particularly to such a process intended for the production of reclaimed rubber well adapted for electrical purposes.

In the process of reclaiming vulcanized rubber, such as discarded automobile tires and similar articles of manufacture, the article is first mechanically broken up or coarsely disintegrated to expose the fabric and rubber particles to the subsequent chemical treatment. Originally, the mechanically disintegrated rubber and fabric was subjected to treatment with a solution of sulphuric acid to destroy the fabric and free the vulcanized rubber mass therefrom. After sufficient washing to remove the acid, the remaining mass of rubber was still in a tough, vulcanized condition, and required further treatment with oils and high-pressure steam to secure the necessary plasticity for manipulation and reworking. Latterly, the mechanically disintegrated rubber has been treated with a solution of caustic soda in the presence of high-pressure steam to destroy the fabric and free the vulcanized rubber therefrom. This treatment serves, coincident with the removal of the fabric, to plasticize the rubber and permit its reuse with no further treatment except the removal of the alkali solution. Although this second method of reclaiming the vulcanized rubber in articles of manufacture is economical and efficient, the rubber so reclaimed may not be satisfactorily used for electrical purposes, due to its comparatively low insulating characteristics.

I have discovered that alkali reclaimed rubber when treated with an oxidizing medium capable of an acid reaction on mixture with the stock, undergoes a marked improvement in insulating properties, and when admixed with varying proportions of crude, unreclaimed rubber is comparable in its insulating qualities to new rubber. My experiments have indicated clearly that treatment of alkali reclaimed rubber according to my new method multiplies many times the resistance of the resulting compound under any given electrical potential impressed thereon.

According to one method of practising my invention, vulcanized rubber reclaimed with an alkali solution, after being washed and dried, is thoroughly mixed with from one to five per cent. approximately of concentrated sulphuric acid. Thereafter, the product so treated, when employed for insulating purposes, may be used in formulas in which the percentages of new and crude rubber may conceivably vary from 3 per cent. of new rubber and 50 per cent. of reclaimed rubber to 10 per cent. of new rubber and 35 per cent. of reclaimed rubber. My experiments have indicated that the electrical properties of the insulation improved with increased proportions of rubber reclaimed according to my process.

According to one mode of procedure which I have found satisfactory, discarded tire stock is first mechanically broken up to coarsely disintegrate the fabric and vulcanized rubber adhering thereto. The disintegrated stock is then treated with a solution of caustic soda in the presence of high-pressure steam until the fabric is completely destroyed and the vulcanized rubber sufficiently plasticized for further manipulation. The digesting of the fabric by the caustic soda may be aided through mechanical agitation carried on coincidentally with the chemical treatment. After the vulcanized stock has been thoroughly digested, it is washed with water to remove the alkali and dried. Thereafter, without further grinding or mixing with other ingredients, the stock is thoroughly mixed with one per cent. of a commercial concentration of sulphuric acid of 66° Bé. approximately. I prefer to accomplish this in a rubber mixing mill having the usual rolls. The alkali reclaimed rubber is masticated until it adheres to one of the rolls as a uniform plastic sheet. Sulphuric acid may then be poured over the sheet to cause uniform distribution, and the plastic mass thereafter cut and folded until the desired mixture is obtained. As an alternative procedure the acid, if desired, may be made into a paste with an inert rubber filler, such as clay, infusorial earth, and the resulting paste incorporated with the plastic mass of reclaimed rubber. Following the acid treatment, the rubber mass is subjected to straining and refining processes. Thereafter the reclaimed rubber is ready for mixture with the crude rubber for use in insulation.

In addition to sulphuric acid, acids such as nitric and chromic are suitable for my purpose; also the acid salts of acids which are capable of oxidizing effects, such as sodium bisulphate; also salts resulting from the reaction of weak inorganic bases with acids capable of oxidizing effects, such as ammonium sulphate. I also believe that salts resulting from the reaction of weak organic bases with acids capable of oxidizing effects, such as aniline sulphate and substances which form acids upon dissociation when mixed with the reclaimed rubber, such as aluminum sulphate, potassium bichromate, are well suited for my purpose. On the other hand, acids incapable of producing oxidizing effects, such as phosphoric acid, and oxidizing agents having an alkaline reaction, such as sodium peroxide, either produce no improvement in the product or actually depreciate it.

Although I have described the use of concentrated commercial sulphuric acid as a reagent well adapted for employment in my process, it will be understood by those skilled in the art that equivalent effects may be produced, if so desired, by boiling the alkali reclaimed rubber with dilute sulphuric acid. This boiling with dilute sulphuric acid is not to be confused with a mere neutralization of any free caustic that may be present in the reclaimed rubber. The boiling with the dilute acid not only serves to neutralize free alkali but also produces an oxidizing effect which is demonstrated by the formation of reduction products. Inasmuch as the dilute sulphuric acid is a milder oxidizing agent than the concentrated acid, higher temperatures, greater quantities, and longer treatments are required.

The following will serve as a specific illustration of the improvement in insulating qualities made possible by my method. An alkali reclaimed rubber from discarded tires made up into an insulating compound with all precautions observed, broke down under a potential difference of less than 1000 volts and indicated a resistance of approximately 500 megohms for 1000 feet of No. 14 code wire values. On the other hand, with similar stock treated according to my new method, a potential difference of 2000 volts is insufficient to break down the insulation, and the resistance per 1000 feet on 14 code wire rises to over 5000 megohms. In addition, actual experiments indicated insulation so processed withstood a potential of 30,000 volts for a period of ten minutes with a resistance of 8000 megohms per 1000 feet.

What is claimed is:

1. A method of reclaiming vulcanized rubber which consists in digesting the vulcanized rubber stock with an alkali to plasticize the stock, washing the plasticized stock to remove the alkali, and treating the stock with a substance which upon mixture therewith reacts as an acid and effects oxidation.

2. A method of reclaiming vulcanized rubber which consists in digesting the vulcanized rubber stock with an alkali to plasticize the stock, washing the plasticized stock to remove the alkali, and mixing the stock with an oxidizing medium having an acid reaction.

3. A method of reclaiming vulcanized rubber which consists in mechanically breaking up the vulcanized stock, digesting the stock with an alkali to plasticize, removing the alkali from the stock, and treating the washed stock with a substance which upon mixture therewith reacts as an acid and effects oxidation.

4. A method of reclaiming rubber stock which consists in digesting the stock with an alkali capable of destroying the fabric and plasticizing the rubber, washing to remove caustic, then drying the reclaimed stock, and mixing with the dried stock a small percentage of an oxidizing agent having an acid reaction.

5. A method of reclaiming rubber stock which consists in digesting the stock with an alkali capable of destroying the fabric and plasticizing the rubber, washing to remove caustic, then drying the washed stock, and mixing with the dried stock a small percentage of reagent containing the radical $SO_4$ and having an acid reaction.

6. A method of reclaiming vulcanized rubber which consists in mechanically breaking up the vulcanized stock, digesting the stock with caustic soda to destroy the fabric and to plasticize the rubber, washing the stock to remove alkali, and digesting the washed stock with dilute sulphuric acid.

7. That step in the method of reclaiming vulcanized rubber stock which consists in mixing alkali reclaimed and plasticized rubber stock with a substance which upon mixture with the stock reacts as an acid and effects oxidation.

8. That step in the method of reclaiming vulcanized rubber stock which consists in mixing alkali reclaimed and plasticized rubber stock with sulphuric acid.

9. That step in the method of reclaiming vulcanized rubber stock which consists in mixing alkali reclaimed and plasticized rubber stock with less than two per cent. approximately of concentrated sulphuric acid.

10. A method of producing insulating compounds which comprises digesting vulcanized rubber stock with an alkali capable of destroying the fabric and plasticizing the rubber, removing the alkali, thoroughly mixing with the plasticized stock a substance which upon mixture reacts therewith as an acid and effects oxidation, and finally incorporating this stock in a compound having a smaller percentage of new crude rubber.

11. A method of reclaiming vulcanized rubber stock which consists in digesting the rubber stock with an alkali to plasticize the stock, washing the plasticized stock to remove the alkali, and treating the stock with the acid salt of an acid capable of oxidizing effects.

12. A method of reclaiming vulcanized rubber stock which consists in digesting the rubber stock with an alkali to plasticize the stock, washing the plasticized stock to remove the alkali, and treating the stock with a salt obtained from the reaction of a weak, inorganic base with an acid capable of oxidizing effects.

13. A method of reclaiming vulcanized rubber stock which consists in digesting the rubber stock with an alkali to plasticize the stock, washing the plasticized stock to remove the alkali, and treating with a salt formed from the reaction of an organic base with an acid capable of oxidizing effects.

MORRIS OMANSKY.